United States Patent [19]

De La Bourdonnaye

[11] Patent Number: 5,212,687
[45] Date of Patent: May 18, 1993

[54] ARRANGEMENT FOR TRANSMITTING OVER A TIME-DIVISION MULTIPLEX LINE DIFFERENT CHANNELS HAVING VARIOUS BIT RATES

[75] Inventor: Philippe De La Bourdonnaye, Rocquencourt, France

[73] Assignee: U. S. Philips Corporation, New York, N.Y.

[21] Appl. No.: 805,357

[22] Filed: Dec. 9, 1991

[30] Foreign Application Priority Data

Dec. 14, 1990 [FR] France ............... 90 15691

[51] Int. Cl.$^5$ .................................. H04J 3/16
[52] U.S. Cl. ........................ 370/84; 370/102
[58] Field of Search ............ 370/77, 79, 84, 102

[56] References Cited

U.S. PATENT DOCUMENTS 3,982,077 9/1976 Clark et al. ............... 370/84
4,460,993 7/1984 Hampton ................. 370/84

FOREIGN PATENT DOCUMENTS 3619371 12/1987 Fed. Rep. of Germany .

Primary Examiner—Benedict V. Safourek
Attorney, Agent, or Firm—Anne E. Barschall

[57] ABSTRACT

The arrangement multiplexes channels of differing bit rates onto a multiplex line. Channels are split according to a table assembled in a channel splitter. The table has a plurality of lines numbered by an index j. Each line j contains j $\Delta_i$, j $\Delta S$, and j $\Delta X$, where $\Delta_i = di/dMAX$, $\Delta S = dS/dMAX$, and $\Delta X = dX/dMAX$, i is an index numbering the multiplex channel, di is the bit rate of the channel i, dS is the rate of the service data, dMAX is the fastest of the di and dS, $$dX = dTDM - \left[\left(\sum_{i=1}^{N} di\right) + dS\right],$$

and dTDM is the bit rate of the multiplex line. The table is assembled until each quantity on the line j exceeds VS, where VS=1+ε. Access to the multiplex line is given to the channel for the values of i where j·$\Delta_i$>kVS+ε, where k is an integer which is incremented each time access is given to the multiplex line and ε is a fixed value preferably equal to zero.

4 Claims, 3 Drawing Sheets

ARRANGEMENT FOR TRANSMITTING OVER A TIME-DIVISION MULTIPLEX LINE DIFFERENT CHANNELS HAVING VARIOUS BIT RATES

The present invention relates to an arrangement for transmitting, over a time-division multiplex line which has a bit rate dTDM, different channels C1, ..., CN which have the respective bit rates $$d1, \ldots, dN \left( \sum_{i=1}^{N} di \leq dTDM \right),$$

The arrangement includes; a transmit section formed by a multiplexer for giving, both to the arriving data of said channels and, to service data which have the rate dS, access to the multiplex line under the control of a first channel splitter. The arrangement also includes a receive section formed by a demultiplexer for supplying data leaving said channels from said multiplex line under the control of a second channel splitter synchronized with the first splitter.

This type of arrangement finds its application where different user circuits operating at different rates are to be connected by means of a multiplex line of the type defined by the Recommendation X 58 of the C.C.I.T.T.

German Patent Application 36 19 371 describes such an arrangement in which the access of the different channels to the multiplex line is given in proportion to their rate. However, in that Application nothing is observed as regards the manner in which this access is given. It may be assumed that this prior-art system is poorly-adjusted to the case where the rate of one or more channels changes.

In the present invention an arrangement is proposed of the type mentioned in the opening paragraph, in which the channels are assigned in a simple manner and which is suitable for maintaining a good operating quality even if a rate change is proposed for one or several channels.

Therefore, an arrangement of this type is characterized in that the channel splitters are arranged to split the channels in the following manner on the basis of a rate dPG which has the Greatest Common Division of the rates of data to be transmitted including the service data rate:

Determination of the largest rate(s) dMAX of the di and dS,
Calculation of an increment $\Delta_i = di/dMAX$,
Determination of a stuffing rate dX:

$$dX = dTDM - \left[ \left( \sum_{i=1}^{N} di \right) + dS \right]$$

Assembly of a Table in which for each information signal at the rate di and for each line j is calculated j $\Delta_i$, j $\Delta S$, j $\Delta X$ until each quantity exceeds a value VS:

$$VS = 1 + \epsilon$$

the access to the multiplex line is given to the channel for the values of i:

$$j \cdot \Delta_i > kVS + \epsilon$$

where k is an integer incrementing each time when access is given to the multiplex line and where $\epsilon$ is a fixed value preferably equal to 0.

The following description with respect to the appended drawings, all given by way of non-limiting example, will make it better understood how the invention may be realised, in which.

Figure 1:
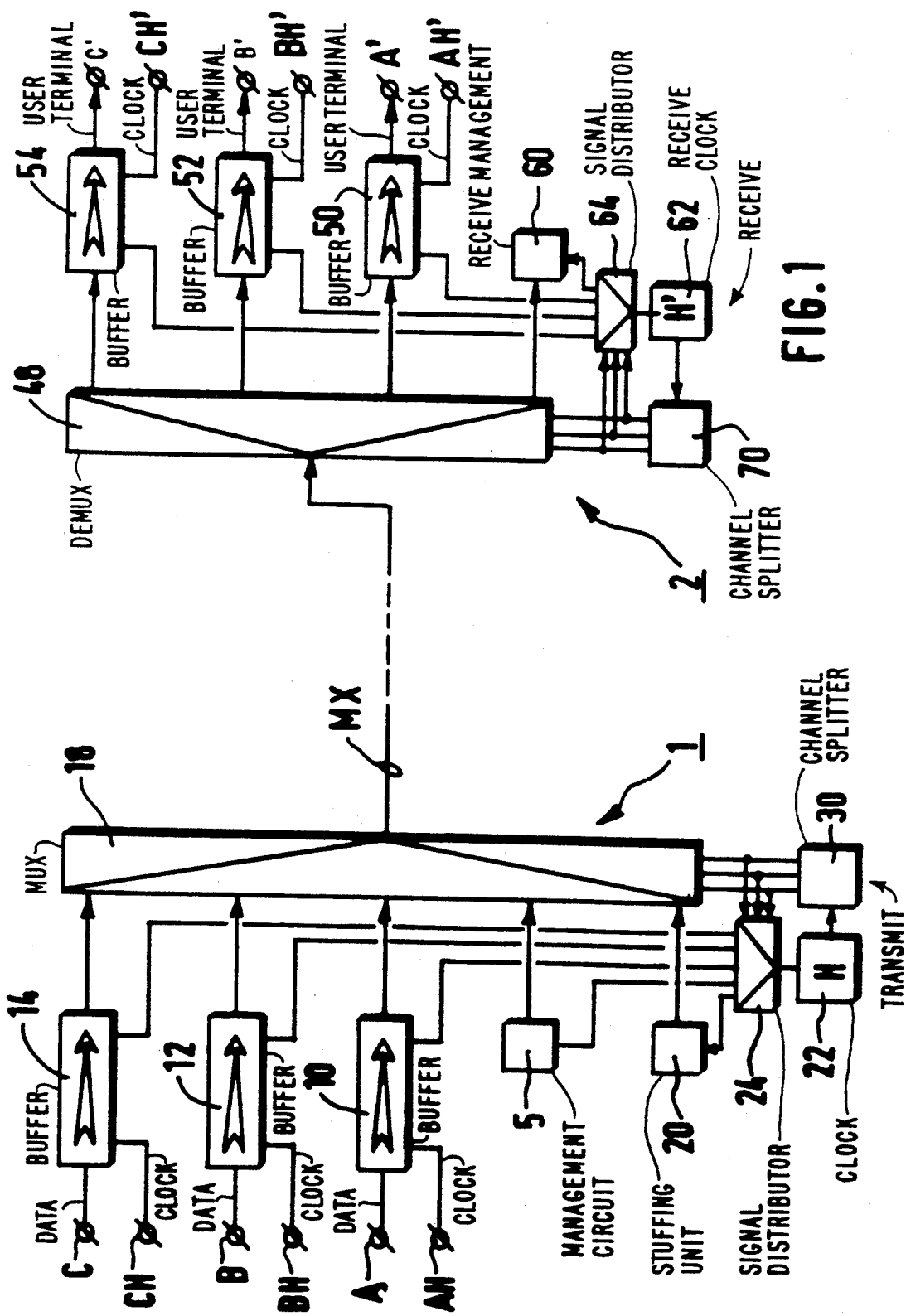
FIG. 1 represents an arrangement according to the invention.

The arrangement shown in FIG. 1 is formed by a transmit section 1 and a receive section 2.

Section 1 has ports A, B, C which receive information signals at various rates d(A), d(B) and d(C). For example, the following is received:
at A: data at a rate of 1200 bits per second,
at B: data at a rate of 2400 bits/s., and
at C: data at a rate of 4800 bits/s.

In addition, a management circuit 5 is to transmit service bytes (synchronization, ...) with a timing of 200 bits/s at the rates referenced dS1 and dS2.

All these data are transmitted in bytes over a line MX according to a multiplex mode, presenting a transmit rate of 9600 bits/s. This rate is called dTDM.

In order to realise this multiplexing, various means are provided.

Buffers 10, 12, 14 are inserted between the ports A, B and C and the inputs of a multiplexer 18. The other inputs of this multiplexer are connected to an output of the management circuit 5 and the output of a stuffing unit 20. The buffers are of the FIFO type (First In First Out) are written at the clock rate applied to the respective clock inputs AH, BH and CH. They are read out at the rate of a clock 22 so that the multiplex rate over the line MX is fixed. These signals are applied to the buffers 10, 12 and 14 via a signal distributor 24. The clock 22 also applies its signals to a channel splitter 30 which controls the multiplexer 18 and, concomitantly, the distributor 24.

The receive section comprises a demultiplexer 48 whose input is coupled to the line MX and whose outputs are connected to user terminals A', B' and C' via the buffers 50, 52 and 54 of the same type as the buffers 10, 12 and 14. A second output of this demultiplexer is connected to a receive management circuit 60 for processing the received management information signals.

The received information signals are stored in the buffers 50, 52 and 54 at the rate of a receive clock 62 whose signals are applied to these buffers via a signal distributor 64. The clock 62 is synchronized by means (not shown) with the rate of the multiplex signals transmitted over the line MX. A channel splitter 70 controls the positions of the demultiplexer 48 and of the distributor 64.

The user circuits connected to the terminals A', B' and C' tap the information signals contained in the buffers 50, 52 and 54 by applying respective clock signals to the inputs AH', BH' and CH'.

The channel splitter operates according to the invention in the following manner in response, on the one hand, to the multiplex line rate and, on the other hand, to the rates of the user circuits.

1) Choice of the GCD (Greatest Common Divisor) of all the possible rates (in practice, this GCD=200 bits/s).

2) Determination of the highest rate of d(A), d(B), d(C), dS2, i.e. dS2, i.e. dMAX.

3) Determination of the stuffing rate d(X):

$$d(X) = DTDM - \{[d(A)+d(B)+d(C)] - (dS1+dS2)\}.$$

4) Calculation of an increment $\Delta A$, $\Delta B$, $\Delta C$, $\Delta S1$, $\Delta S2$ and $\Delta X$ relative to this maximum rate, i.e.:

$$\Delta A = d(A)/dMAX$$

$$\Delta B = d(B)/dMAX$$

$$\Delta C = d(B)/dMAX$$

$$\Delta X = d(X)/dMAX$$

$$\Delta S1 = dS1/dMAX$$

$$\Delta S2 = dS2/dMAX$$

5) Assembly of a Table in which we have for each channel and each line i:

$$i.\Delta A, i.\Delta B, i.\Delta C, i.\Delta X \text{ and } i.\Delta S.$$

6) The choice of the channel is determined by:

$$i.\Delta j = N + \epsilon \quad j = A, B, C, X, S1 \text{ or } S2$$

where

N is an integer, $\epsilon$ is a value preferably equal to zero.

The Table hereinbelow shows an embodiment of the invention.

| | C = 4800 | B = 2400 | A = 1200 | S1 = 200 | S2 = 200 | X = 9600 − (C + B + A + S1 + S2) = 800 | |
|---|---|---|---|---|---|---|---|
| Δ | 1 | 0.5 | 0.25 | 0.0416 | 0.0416 | 0.1666 | |
| 1 | 1 | 0.5 | 0.25 | 0.0416 | 0.0416 | 0.1666 | C |
| 2 | 2 | 1 | 0.5 | 0.0833 | 0.0833 | 0.3333 | CB |
| 3 | 3 | 1.5 | 0.75 | 0.1250 | 0.1250 | 0.5000 | C |
| 4 | 4 | 2 | 1 | 0.1666 | 0.1666 | 0.6666 | CBA |
| 5 | 5 | 2.5 | 1.25 | 0.2083 | 0.2083 | 0.8333 | C |
| 6 | 6 | 3 | 1.50 | 0.2500 | 0.2500 | 1 | CBX |
| 7 | 7 | 3.5 | 1.75 | 0.2916 | 0.2916 | 1.1666 | C |
| 8 | 8 | 4 | 2 | 0.3333 | 0.3333 | 1.3333 | CBA |
| 9 | 9 | 4.5 | 2.25 | 0.3750 | 0.3750 | 1.500 | C |
| 10 | 10 | 5 | 2.50 | 0.4166 | 0.4166 | 1.666 | CB |
| 11 | 11 | 5.5 | 2.75 | 0.4583 | 0.4583 | 1.8333 | C |
| 12 | 12 | 6 | 3 | 0.500 | 0.500 | 2 | CBAX |
| 20 | 20 | 10 | 5 | 0.8333 | 0.8333 | 3.3333 | CBA |
| 21 | 21 | 10.5 | 5.25 | 0.8749 | 0.8749 | 3.5000 | C |
| 22 | 22 | 11 | 5.50 | 0.9166 | 0.9166 | 3.666 | CB |
| 23 | 23 | 11.5 | 5.75 | 0.9583 | 0.9583 | 3.8333 | C |
| 24 | 24 | 12 | 6 | 1 | 1 | 4 | CBAX S1 S2 |
| | | | | | | END OF FRAME | |
| | 25 | 12.5 | | | | | | whence the frame:

C CB C CBA C CBX C CBA C CB C CBAX ... CBA C CB C CBAX S1 S2.

The service bytes S1 and S2 which have a frame synchronization pattern define the frame because the rate assigned thereto is the lowest rate and the other rates have this same rate as their GCD (Greatest Common Divisor).

In these service bytes one may transmit information indicating a rate change for the different channels, for example, the channel B performs at 1200 Baud and the channel A at 2400, so that the new frame is derived from the one already described by exchanging the letters B and A.

Figure 2:
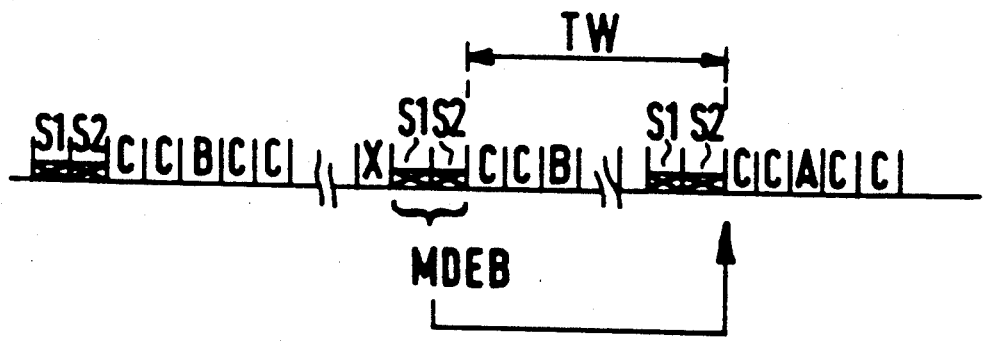
FIG. 2 shows a change of the frame structure in the case where the timing of a channel is changed.

FIG. 2 explains this rate change. The bytes S1 and S2 contain the values of the rates to be changed, i.e. an information symbol MDEB. During the time interval TW representing one or several consecutive frames, the new splitting is defined both at the splitter 30 and the splitter 70. At the end of the time interval TW the new splitting is ensured. It should be observed that the channels (the channel C in this example) whose rates are to be ensured are not disturbed by this change.

Figure 3:
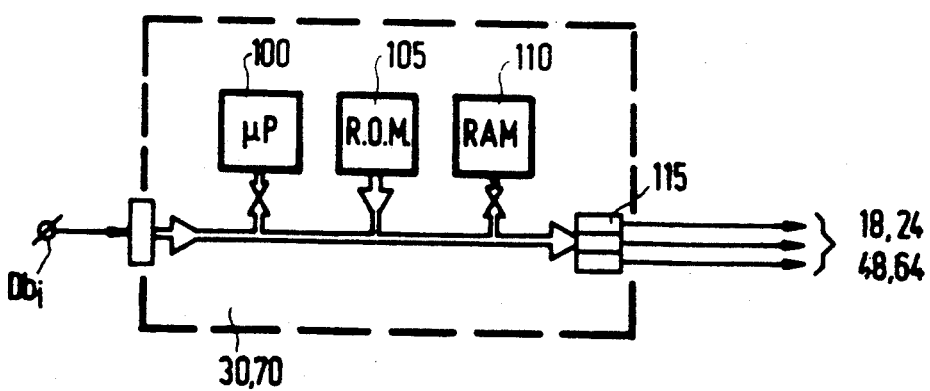
FIG. 3 shows a preferred embodiment of the channel splitters.

FIG. 3 shows a preferred embodiment of the channel splitters 30 and 70. The values of the rates of the different channels are to occur at the inputs of these splitters. For the splitter 30 they are directly available. For the splitter 70 they are transmitted in the manner already described.

These splitters are formed by a microprocessor 100 around which is arranged a read-only memory 105 for specifically containing an operating program, a random-access memory 110 to be used for executing the program and an output register 115 which contains the control code of the multiplexer 18 and a distributor 24.

Figure 4:
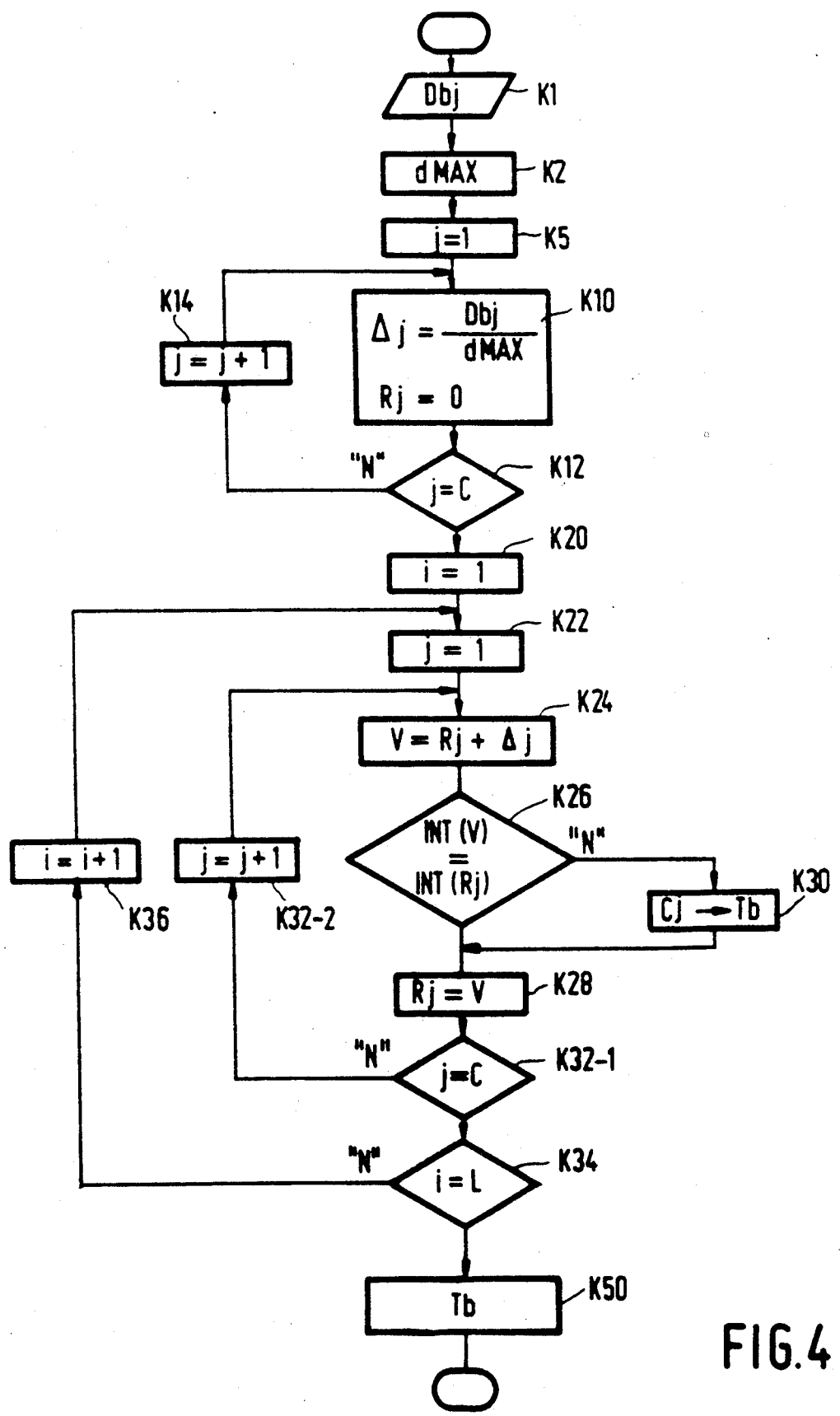
FIG. 4 is a flow chart explaining the operation of the splitters.

The operation of these splitters is explained with the aid of the flow chart shown in FIG. 4. Two phases of this operation can be distinguished:

1) Phase of establishing the frame

This phase is commenced by the reading of different requested rates Dbj, for the channels 1 to c (box K1). Then the maximum rate(s) dMAX is (are) determined (box K2). A variable j is intialized (box K5) which is to be used as an index and assigned to each channel number. In box K10 the increment $\Delta_j$ is determined and also a variable intermediate value $R_j$, that can be used for the rest of the program, is initialized. In box K12 the value of j is checked; if not all the channels have been processed, the index "j" is incremented by unity (box K14) to execute the operations of the box K10 which relate to the next channel. If all the channels have been processed, box K20 is proceeded to where the index "i" is set to "1". This index corresponds to the line number of the Table below. In box K22, which is to follow, the index "i" which relates to the channel numbers is re-initialized. In box K24 a quantity V representing the sum of the increment and the value $R_j$ is represented. Then, in box K26, it is checked whether the integer parts of V and $R_j$ are identical, that is to say, whether they have not been changed by the increment. In this case $R_j$ assumes the value of V in box K28. If the increment is not the same, the value of j, which represents the channel, is put in a splitter Table Tb (box K30). This Table is a stack memory which forms part of memory 110. Then it is checked (box K32-1) whether all the variables $R_j$ have been incremented for all the channels. If they have not, box K24 is returned to after incrementation of the index j (box K32-2). If all the results of $R_j$ have been processed for all the channels, it is checked (box K34) whether the lines of the Table have been processed as L. If they have not, the index i is incremented (box K36) before box K22 is returned to. If the check of the box K34 is positive, the first phase is terminated and the Table Tb has the structure of the frame.

2) Connecting phase.

This phase indicated at box K50 consists of reading Table Tb and making the codes relating to different channels available in the register 115.

I claim:

1. Arrangement for transmitting a plurality of channels C1, ..., CN, which have the respective bit rates d1, ..., dN, over a timedivision multiplex line which has a bit rate dTDM, where the sum of the respective bit rates is less than or equal to dTDM, the arrangement comprising
   a) a transmit section including
      i) means for receiving data from the plurality of channels,
      ii) a multiplexer for supplying the data to the multiplex line along with service data, which service data has a bit rate dS, and
      iii) a channel splitter for controlling the supply of data from the multiplexer; and
   b) a receive section including
      i) a demultiplexer for supplying data received from the multiplex line, and
      ii) a second channel splitter for controlling the demultiplexer
   wherein the channel splitters cooperate to split the channels on the basis of a rate dPG which is the Greatest Common Divisor of the rates of data to be transmitted, including the bit rate dS, and perform the following operations:
   A) assembling a table having a plurality of rows numbered by an index j, each row containing j $\Delta_i$, j $\Delta S$, and j $\Delta X$, where $\Delta_i = di/dMAX$, $\Delta S = dS/dMAX$, and $\Delta X = dX/dMAX$, i is an index numbering the multiplex channels, di is the bit rate of the channel i, dS is the rate of the service data, dMAX is the fastest of the di and dS, and $$dX = dTDM - \left[\left(\sum_{i=1}^{N} di\right) + dS\right],$$

until each value in a current row exceeds a quantity VS, where $VS = 1 + \epsilon$; and
   B) allowing access to the multiplex line for a channel i when $$j \cdot \Delta_i > kVS + \epsilon;$$

where k is an integer incremented each time when access is given to a multiplex line and where $\epsilon$ is a fixed value.

2. The apparatus of claim 1 wherein $\epsilon = 0$.

3. The apparatus of claim 1 wherein the channel splitters perform the following further operations
   determining dMAX;
   calculating the $\Delta_i S$; and
   determining dX.

4. A channel splitter for use in a multiplexer multiplexing a plurality of channels C1, ..., CN, which have the respective bit rates d1, ..., dN, over a time-division multiplex line which has a bit rate dTDM, where the sum of the respective bit rates is less than or equal to dTDM, the channel splitter comprising
   A) means for assembling a table having a plurality of rows numbered by an index j, each row containing j $\Delta_i$, j $\Delta S$, and j $\Delta X$, where $\Delta_i = di/dMAX$, $\Delta S = dS/dMAX$, and $\Delta X = dX/dMAX$, i is an index numbering the multiplex channels, di is the bit rate of the channel i, dS is the rate of the service data, dMAX is the fastest of the di and dS, and $$dX = dTDM - \left[\left(\sum_{i=1}^{N} di\right) + dS\right],$$

until each value in a current row exceeds a quantity VS, where $VS = 1 + \epsilon$; and
   B) coupling means for allowing access to the multiplex line for a channel i when $j \cdot \Delta_i > kVS + \epsilon$; where k is an integer incremented each time when access is given to a multiplex line and where $\epsilon$ is a fixed value.

* * * * *